United States Patent
Takahashi

(10) Patent No.: US 11,685,042 B2
(45) Date of Patent: Jun. 27, 2023

(54) WORKING ROBOT AND CONTROL METHOD FOR WORKING ROBOT

(71) Applicant: CANON KABUSHIKI KAISHA, Tokyo (JP)

(72) Inventor: Masakazu Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 16/740,208

(22) Filed: Jan. 10, 2020

(65) Prior Publication Data

US 2020/0147787 A1 May 14, 2020

Related U.S. Application Data

(63) Continuation of application No. PCT/JP2018/027015, filed on Jul. 19, 2018.

(30) Foreign Application Priority Data

Jul. 20, 2017 (JP) .............................. JP2017-141250
Jul. 4, 2018 (JP) .............................. JP2018-127463

(51) Int. Cl.
  *B25J 9/00* (2006.01)
  *B25J 9/16* (2006.01)
  *B25J 13/08* (2006.01)

(52) U.S. Cl.
  CPC ............. *B25J 9/0081* (2013.01); *B25J 9/163* (2013.01); *B25J 9/1633* (2013.01); *B25J 9/1687* (2013.01); *B25J 9/1694* (2013.01); *B25J 13/085* (2013.01)

(58) Field of Classification Search
  CPC ........ B25J 9/1641; B25J 9/0081; B25J 9/163; B25J 9/1633; B25J 9/1687; B25J 9/1694;
  (Continued)

(56) References Cited

U.S. PATENT DOCUMENTS 9,375,841 B1\* 6/2016 Kemper .................... B25J 17/00
9,522,470 B2 12/2016 Nakagawa
(Continued)

FOREIGN PATENT DOCUMENTS

CN 104249195 A 12/2014
EP 2 258 521 A1 12/2010
(Continued)

OTHER PUBLICATIONS

European Office Action dated Mar. 4, 2021 in corresponding European application No. 18834923.7.
(Continued)

*Primary Examiner* — Abby Y Lin
*Assistant Examiner* — Dylan M Katz
(74) *Attorney, Agent, or Firm* — Venable LLP

(57) ABSTRACT

A working robot includes an arm including a plurality of shafts, a hand, a controller, a handling portion configured to receive a manipulating force applied by a teaching operator, a manipulating force detection portion configured to detect the manipulating force, and a reaction force detection portion configured to detect a reaction force received by the hand from a work target object. When the teaching operator teaches an operation of the arm and the hand for generating a work operation program, in a case where the reaction force has not been detected, the controller adjusts a parameter of impedance control such that resistance to movement of the hand applied is reduced, and in a case where the reaction force has been detected by the reaction force detection portion, the controller adjusts the parameter of impedance control such that the resistance to movement of the hand applied is increased.

32 Claims, 10 Drawing Sheets

(58) Field of Classification Search
CPC ......... B25J 13/085; G05B 2219/37396; G05B 2219/40372; G05B 19/423
See application file for complete search history.

(56) References Cited

U.S. PATENT DOCUMENTS

| | | | |
|---|---|---|---|
| 9,919,424 B1* | 3/2018 | Devengenzo | G05B 19/423 |
| 2002/0011092 A1* | 1/2002 | Hara | G01L 25/00 73/1.13 |
| 2009/0105880 A1* | 4/2009 | Okazaki | B25J 9/1633 700/258 |
| 2009/0171505 A1* | 7/2009 | Okazaki | B25J 13/084 700/258 |
| 2011/0190932 A1 | 8/2011 | Tsusaka | |
| 2011/0301758 A1 | 12/2011 | Nakajima | |
| 2013/0184869 A1 | 7/2013 | Inazumi | |
| 2014/0156066 A1* | 6/2014 | Sakano | B25J 9/1633 700/245 |
| 2015/0209961 A1* | 7/2015 | Komatsu | B25J 9/1676 700/255 |
| 2015/0290809 A1* | 10/2015 | Nakagawa | B25J 9/1676 700/258 |
| 2017/0217028 A1* | 8/2017 | Stockschlaeder | B25J 9/0096 |
| 2017/0285625 A1* | 10/2017 | Sato | G05B 19/423 |
| 2018/0107174 A1* | 4/2018 | Takahashi | G05B 9/02 |
| 2018/0210434 A1* | 7/2018 | Iwatake | B25J 9/0081 |
| 2019/0009410 A1* | 1/2019 | Radrich | B25J 9/1692 |
| 2019/0248006 A1 | 8/2019 | Takahashi | |

FOREIGN PATENT DOCUMENTS

| | | |
|---|---|---|
| EP | 2 896 487 A1 | 7/2015 |
| JP | S64-45586 | 2/1989 |
| JP | H03-123907 | 5/1991 |
| JP | H06-250728 | 9/1994 |
| JP | H08-141961 A | 6/1996 |
| JP | 2000-254184 A | 9/2000 |
| JP | 2008-110406 A | 5/2008 |
| JP | 2013-111684 | 6/2013 |
| JP | 2015-199174 | 11/2015 |

OTHER PUBLICATIONS

Japanese Office Action dated Oct. 4, 2022 in corresponding Japanese application No. 2018-127463 (English language translation included).

Chinese Office Action dated Jul. 21, 2022 in corresponding Chinese application No. 201880048744.7 (English language translation included).

* cited by examiner

FIG.4

| REACTION FORCE [N] | VISCOSITY c | ELASTICITY k |
|---|---|---|
| 1 | C1 | K1 |
| 3 | C3 | K3 |
| 5 | C5 | K5 |
| 10 | C10 | K10 |
| 15 | C15 | K15 |
| 20 | C20 | K20 |

DURING TEACHING

DURING WORK
SECTION FROM P1 TO P2
FORCE CONTROL

DISPLACEMENT OF THE
ASSEMBLY TARGET OBJECT

DURING WORK
SECTION FROM P2 TO P3
POSITION (ORIENTATION) CONTROL

DURING WORK
SECTION FROM P3 TO P4
FORCE CONTROL

WORKING ROBOT AND CONTROL METHOD FOR WORKING ROBOT

CROSS-REFERENCE TO RELATED APPLICATIONS

This application is a Continuation of International Patent Application No. PCT/JP2018/027015, filed Jul. 19, 2018, which claims the benefit of Japanese Patent Application No. 2017-141250, filed Jul. 20, 2017, and Japanese Patent Application No. 2018-127463, filed Jul. 4, 2018, which are hereby incorporated by reference herein in their entirety.

BACKGROUND OF THE INVENTION

Field of the Invention

The present invention relates to a working robot and a method for teaching the working robot a work operation. Particularly, the present invention relates to a working robot to which a teaching operator can teach a work trajectory by directly applying a force to the robot.

Description of the Related Art

Conventionally, when teaching a robot an operation, an operation of moving a distal end portion of an end effector or the like to a predetermined position is performed by using a remote controller terminal such as a teaching pendant, and a teaching position is stored while confirming the position by visual observation or the like. In this case, the movement speed, acceleration, and the like need to be individually adjusted between teaching positions. In the teaching method using a teaching pendant, the robot is moved by inputting numerical values of coordinates or repetitively performing a JOG operation, which is a complicated work and is not good in terms of operability, and therefore teaching cannot be performed efficiently.

As a method of improving the operability of the teaching, for example, Japanese Patent Laid-Open No. H06-250728 discloses a technique in which a teaching operator performs teaching while manipulating a robot by directly applying a force thereto by hand.

In the apparatus described in Japanese Patent Laid-Open No. 6-250728, in the case where the teaching operator applies a force to an end effector of the robot body for the purpose of teaching a trajectory, the force is detected by a sensor, and control is performed such that the end effector is moved in a direction of the force. In this case, control is performed such that the end effector is moved only in the direction of the manipulating force applied to the sensor and a direction determined on the basis of an operation direction selected via an operation direction setting switch.

Such an apparatus is convenient because the teaching operator can manipulate the robot by their own hand and therefore can perform a teaching operation intuitively as compared with the case where a remote controller such as a teaching pendant is used.

However, according to the control method described in Japanese Patent Laid-Open No. H06-250728, since the robot automatically moves in the direction of the applied manipulating force in accordance with the manipulating force, for example, even if the robot contacts a work target object, it is difficult for the teaching operator to feel the occurrence of the contact by sensation. Therefore, even if the teaching operator attempts to perform fine position control while bringing the robot into contact with the work target object, there is a possibility that, for example, the robot applies an excessive force to the work target object, and thus intended teaching cannot be performed.

For example, in the case of teaching the robot an operation of gripping a flexible cable and inserting the flexible cable into a connector, sometimes the teaching operator cannot sense by the sensibility of the hand whether or not the distal end of the flexible cable has come into contact with the connector, whether or not the distal end of the flexible cable is sliding in the connector, and the like. Therefore, in some cases, the teaching operator cannot apply an appropriate manipulating force, the flexible cable is deformed into an unintended shape and cannot be successfully inserted, and thus a fine operation cannot be taught to the robot.

SUMMARY OF THE INVENTION

A first aspect of the present invention is a working robot including an arm including a plurality of shafts, a hand, a controller, a handling portion configured to receive a manipulating force applied by a teaching operator when teaching an operation, a manipulating force detection portion configured to detect the manipulating force, and a reaction force detection portion configured to detect a reaction force received by the hand from a work target object. When the teaching operator teaches an operation of the arm and the hand for generating a work operation program, in a case where the reaction force has not been detected by the reaction force detection portion, the controller adjusts a parameter of impedance control such that resistance to movement of the hand applied when moving the hand in a direction of the manipulating force detected by the manipulating force detection portion is reduced, and in a case where the reaction force has been detected by the reaction force detection portion, the controller adjusts the parameter of impedance control such that the resistance to movement of the hand applied when moving the hand in the direction of the manipulating force detected by the manipulating force detection portion is increased.

In addition, a second aspect of the present invention is a control method for a working robot including an arm including a plurality of shafts, a hand, a controller, a handling portion configured to receive a manipulating force applied by a teaching operator when teaching an operation, a manipulating force detection portion configured to detect the manipulating force, and a reaction force detection portion configured to detect a reaction force received by the hand from a work target object. The control method includes, when the teaching operator teaches an operation of the arm and the hand for generating a work operation program, in a case where the reaction force has not been detected by the reaction force detection portion, adjusting a parameter of impedance control by the controller such that resistance to movement of the hand applied when moving the hand in a direction of the manipulating force detected by the manipulating force detection portion is reduced, and in a case where the reaction force has been detected by the reaction force detection portion, adjusting the parameter of impedance control by the controller such that the resistance to movement of the hand applied when moving the hand in the direction of the manipulating force detected by the manipulating force detection portion is increased.

Further features of the present invention will become apparent from the following description of exemplary embodiments with reference to the attached drawings.

BRIEF DESCRIPTION OF THE DRAWINGS

FIG. 4 is a diagram illustrating a parameter table of an impedance control system.

DESCRIPTION OF THE EMBODIMENTS

First Embodiment

A configuration, teaching method, and a work operation of a working robot serving as a first embodiment of the present invention will be sequentially described below with reference to drawings.

Figure 1:
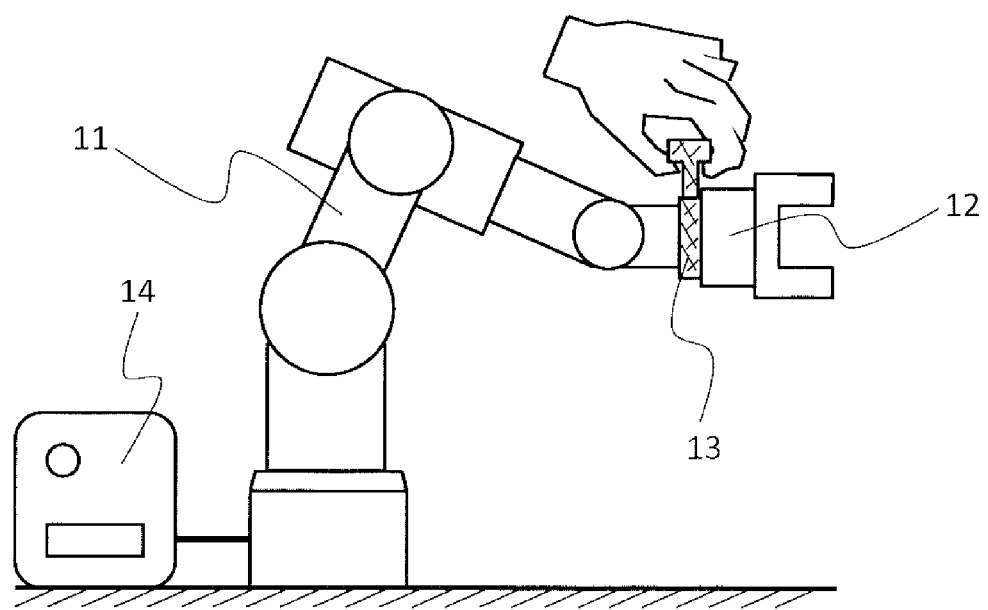
FIG. 1 is a diagram illustrating a simplified configuration of a working robot of a first embodiment.

FIG. 1 is a diagram illustrating a configuration of the working robot of the present embodiment. The working robot illustrated in FIG. 1 includes a robot arm 11, a hand 12 mounted on the distal end of the robot arm, a handling portion 13 mounted between the robot arm 11 and the hand 12, and a robot controller 14 serving as a controller for the working robot as a whole.

The robot arm 11 is an articulated robot arm including a plurality of shafts, and each joint shaft thereof includes a torque sensor therein and incorporates a motor and an encoder that are not illustrated. Although a six-axis arm is used in the present embodiment, the arm may have a different configuration than this.

The encoder incorporated in each joint shaft of the robot arm 11 is capable of detecting angle information of each joint and communicating the measurement result with the robot controller 14 at a predetermined period. The robot controller 14 is capable of calculating the orientation of the robot arm 11 on the basis of a result of detection by the encoder.

The torque sensor incorporated in each shaft of the robot arm 11 is capable of detecting a force applied to the robot arm 11. That is, each torque sensor is capable of measuring a torque applied to each joint shaft and communicating the measurement result with the robot controller 14 at a predetermined period.

In addition, the hand 12 includes a six-axis force sensor therein, and is capable of detecting a reaction force applied when the hand 12 comes into contact with a work target object. The force sensor is capable of measuring forces in X, Y, and Z axes and moments around the respective axes, and communicating the measured forces with the robot controller 14 at a predetermined period. The robot controller 14 is capable of calculating the direction and magnitude of the reaction force applied from the work target object to the hand on the basis of the calculated orientation of the robot arm and the measurement result of the force sensor.

Therefore, it can be said that the robot controller and the six-axis force sensor constitute a reaction force detection means or a reaction force detection portion. To be noted, the force applied to the work target object by the hand and the reaction force applied from the work target object have a mutual action-reaction relationship, and have the same magnitude and opposite directions. Therefore, the robot controller 14 is also capable of calculating the force applied to the work target object by the hand on the basis of the calculated orientation of the robot arm and the measurement result of the force sensor.

The robot controller 14 is capable of calculating the direction and magnitude of a manipulating force applied to the handling portion 13 by the teaching operator, on the basis of the calculated orientation of the robot arm, the torque detected by the torque sensor, and the reaction force detected by the six-axis force sensor. Specifically, the direction and magnitude of the manipulating force applied to the handling portion 13 can be calculated by subtracting the reaction force detected by the six-axis force sensor from the torque detection result detected by the torque sensor.

Therefore, it can be said that the robot controller, the torque sensor, and the six-axis force sensor constitute a manipulating force detection means or a manipulating force detection portion.

In the present embodiment, the torque sensor incorporated in each shaft of the robot arm 11 and the six-axis force sensor of the hand 12 are arranged such that the handling portion 13 is interposed therebetween. By employing such arrangement, the detection accuracy of the external force (manipulating force) applied to the handling portion and the reaction force applied from the work target object can be improved.

The robot controller 14 is a computer including a CPU, a RAM, a ROM, an I/O port, and so forth, and is capable of communicating a signal with the motor, sensor, encoder, and the like in the robot arm and also connecting to an external network and a computer.

The robot controller 14 is capable of generating a driving command for the motor of each joint shaft of the robot arm 11 and performing position control of each joint shaft by feedback control. At this time, the robot controller 14 is capable of performing force feedback control in which the driving command for the motor is changed on the basis of the manipulating force and reaction force obtained from the measurement results of the torque sensor and the force sensor. That is, the control additionally includes force feedback unlike simple position control, and sets a physical response of the hand 12 to a state desirable for teaching operation.

In the present embodiment, the robot controller 14 is capable of adjusting a parameter of an impedance control system for driving the motor of each joint shaft, in accordance with the orientation of the robot arm 11 and the manipulating force applied to the handling portion 13 by the teaching operator. For example, as indicated by P0 at the left end of FIG. 5, when a gripped workpiece 51 gripped by the hand 12 is not in contact with and is separated from an assembly target workpiece 52, the reaction force detected by the six-axis force sensor is 0, and in this case, movement in the direction of the manipulating force applied by the teaching operator is facilitated. That is, the robot controller 14 adjusts the parameter of the impedance control system such that the robot arm is more easily moved in the direction of the manipulating force applied to the handling portion 13 by the teaching operator. Specifically, either one or both of a virtual viscosity coefficient and virtual elasticity coefficient of the control parameters of a joint shaft to be driven for the movement are adjusted. At this time, the adjustment amount of the parameter of the impedance control system may be changed for each joint in accordance with the ratio and magnitude of the movement amount of each joint shaft.

Here, the virtual viscosity coefficient and the virtual elasticity coefficient are control parameters for generating effects respectively similar to cases where a viscus element and an elastic element are connected to the distal end of the robot, in the case of performing force control. Since the virtual viscosity coefficient [N/(mm/s)] or [Nm/(deg/s)] is a parameter indicating a force required for achieving a certain speed, the virtual viscosity coefficient is reduced to facilitate the movement of the hand 12.

In addition, in the present embodiment, when teaching a work trajectory, the parameter of the impedance control system of each joint shaft can be adjusted on the basis of the reaction force from the work target object measured by the force sensor. For example, as indicated by P1 of FIG. 5, when the gripped workpiece 51 gripped by the hand 12 is in contact with the assembly target workpiece 52, the six-axis force sensor detects the reaction force received from the assembly target workpiece 52 through the gripped workpiece 51. In the case where the reaction force has been detected, the robot controller 14 performs control such that it becomes more difficult for the hand 12 to move in the direction of the manipulating force applied by the teaching operator. Specifically, adjustment is made by changing the virtual viscosity coefficient and the virtual elasticity coefficient of the control parameters of the joint shaft of the robot arm driven to move the hand 12 in the direction of the manipulating force applied to the handling portion 13 by the teaching operator, such that the movement becomes more difficult. At this time, the adjustment amount of the parameter of the impedance control system may be changed for each joint in accordance with the ratio and magnitude of the movement amount of each joint shaft.

Since the virtual viscosity coefficient [N/(mm/s)] or [Nm/(deg/s)] is a parameter indicating a force required for achieving a certain speed, the virtual viscosity coefficient is set to be large in order to make the movement harder, that is, to make the teaching operator feel a resistance force when applying the manipulating force.

As described above, the state in which the parameter is adjusted such that the resistance against the movement of the hand 12 in the movement direction of the hand 12, that is, the direction of the manipulating force applied by the teaching operator decreases will be referred to as a state in which the hand 12 can be easily moved. Conversely, the state in which the parameter is adjusted such that the resistance against the movement of the hand 12 in the movement direction of the hand 12, that is, the direction of the manipulating force applied by the teaching operator increases will be referred to as a state in which moving the hand 12 is difficult.

The adjustment method for the parameter of the impedance control system of the present embodiment can be also expressed as follows.

In the case where neither the robot hand nor the workpiece gripped by the robot hand is in contact with the work target object, the reaction force is not detected by the force sensor of the robot hand. When the reaction force is not detected, the robot controller 14 adjusts the parameter of the impedance control system on the basis of the detected manipulating force such that the teaching operator can easily move the robot hand in the direction of the manipulating force.

In the case where the robot hand or the workpiece gripped by the robot hand is in contact with the work target object, the reaction to the force applied to the work target object by the robot hand, that is, the reaction force from the work target object is detected by the force sensor of the robot hand. When the reaction force is detected, the robot controller 14 adjusts the parameter of the impedance control system such that the teaching operator feels difficulty in causing movement in the direction of the manipulating force. To be noted, in the case where the force sensor detects the reaction force, the parameter of the impedance control system may be adjusted with reference to not only the reaction force but also the manipulating force.

In addition, simply increasing or decreasing the virtual viscosity coefficient and virtual elasticity coefficient of the impedance control system does not necessarily make the teaching operator more likely to feel the contact with and slide on the work target object. For example, if the virtual elasticity coefficient [mm/N] or [deg/Nm] is too large, there is a case where the reaction force received from the assembly target is absorbed by a spring component and the force is not transmitted to the manipulating portion. Since there is a case where the parameter should be changed in accordance with the magnitude of the calculated reaction force, it is desirable that a parameter table of the impedance control system corresponding to the magnitude of the reaction force is prepared in advance.

Figure 2:
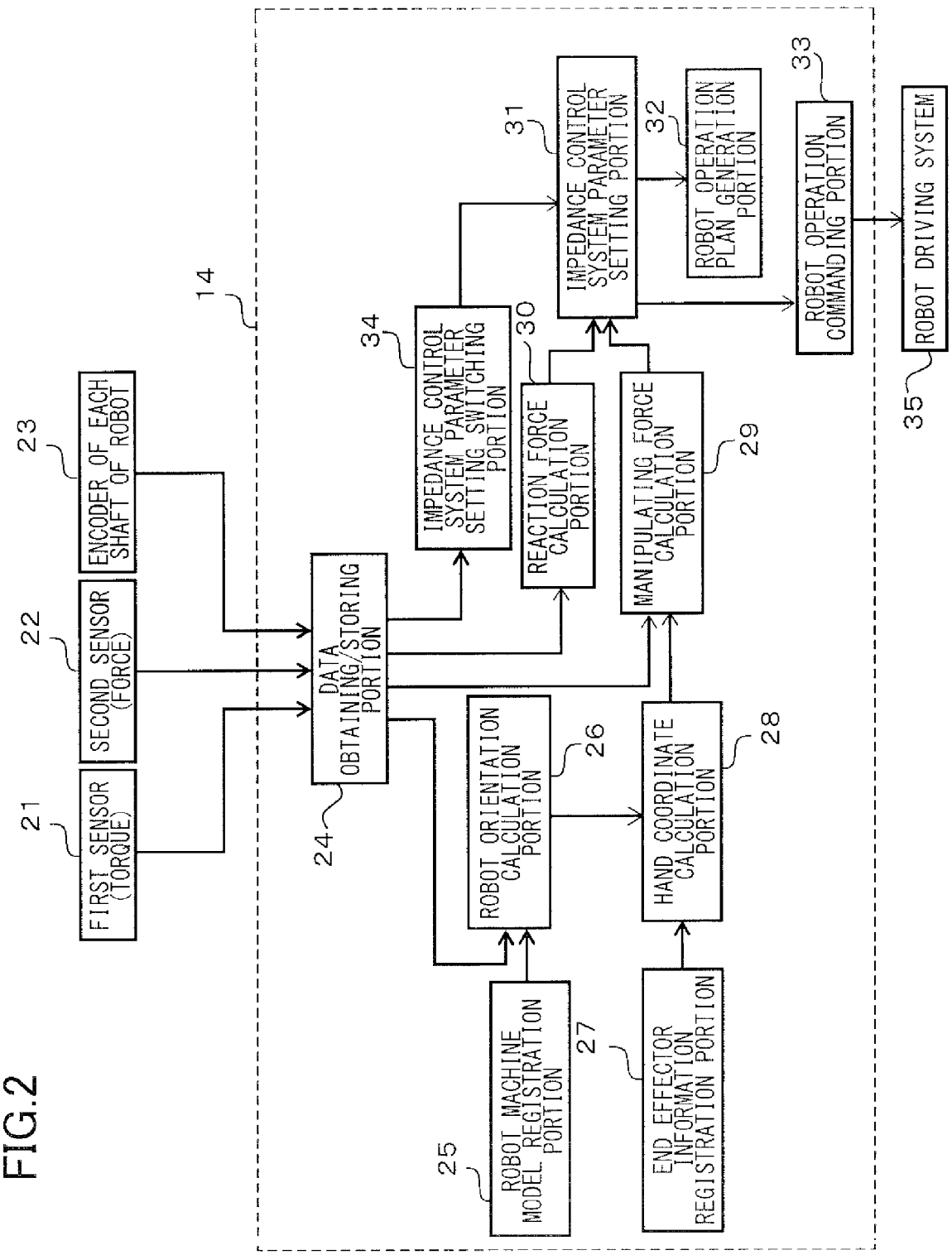
FIG. 2 is a simplified functional block diagram of the first embodiment.

FIG. 2 is a simplified functional block diagram illustrating functional blocks that the robot controller 14 include.

21 represents a torque sensor for detecting the manipulating force as a first sensor, 22 represents a force sensor for detecting the reaction force as a second sensor, and 23 represents an encoder provided in each shaft of the robot.

24 represents a data obtaining/storing portion constituted by an I/O port, a memory, and so forth. The force measured by the torque sensor 21, the force measured by the force sensor 22, and information measured by the encoder 23 of each shaft of the robot are obtained and stored.

25 represents a robot machine model registration portion that stores various information of the robot arm including the shape, dimensions, and the like thereof.

26 represents a robot orientation calculation portion that calculates the position and orientation of the robot arm on the basis of the measurement result of the encoder stored in the data obtaining/storing portion 24 and the information of the robot machine model registration portion 25.

27 represents an end effector information registration portion that stores various information of the hand including the shape, dimensions, and the like thereof.

28 represents a hand coordinate calculation portion that calculates the position and orientation of the hand on the basis of the orientation information calculated by the robot orientation calculation portion 26 and the information of the end effector information registration portion 27.

29 represents a manipulating force calculation portion that calculates the manipulating force (external force) applied to the handling portion 13, on the basis of the measurement value of the torque sensor 21, the orientation information calculated by the robot orientation calculation portion 26, and the position-orientation information of the hand calculated by the hand coordinate calculation portion 28.

30 represents a reaction force calculation portion that calculates the reaction force (external force) that the hand has received from the work target object, on the basis of the measurement value of the force sensor 22 and the position-orientation information of the hand. To be noted, by reversing the direction of the calculated reaction force, the force that the robot hand has applied to the work target object can be also calculated.

31 represents an impedance control system parameter setting portion that, at the time of teaching, sets the virtual viscosity coefficient and/or virtual elasticity coefficient of the impedance control system to a state suitable for teaching using the handling portion 13, on the basis of the calculation result of the manipulating force and the calculation result of the reaction force. In addition, at the time of work, the virtual viscosity coefficient and/or virtual elasticity coefficient of the impedance control system is appropriately switched on the basis of a switching signal from an impedance control system parameter setting switching portion 34.

32 represents a robot operation plan generation portion that, by referring to the measurement values of the torque sensor 21 and the force sensor 22 and the parameter setting value of the impedance control system parameter setting portion 31 at the time of teaching, generates and stores a work program for performing the taught work operation. The generation of the work program will be described later.

33 represents a robot operation commanding portion that, in accordance with the control parameter set by the impedance control system parameter setting portion 31, generates a command to be transmitted to the driving system (motor) of each joint shaft of the robot arm.

34 represents an impedance control system parameter setting switching portion that, at the time of work and on the basis of the measurement values of the torque sensor 21 and the force sensor 22 and the like, switches the setting of the parameter and switches between the force control and the position control.

The function of each block of the robot controller 14 described above is achieved by using hardware resources such as the CPU included therein, the memory storing a program of each function, the RAM for temporarily storing data, and the I/O port through which data is communicated.

In addition, 35 represents a robot driving system that drives the motor and the like of each joint shaft of the robot arm in accordance with the command issued by the robot operation commanding portion 33.

Figure 3:
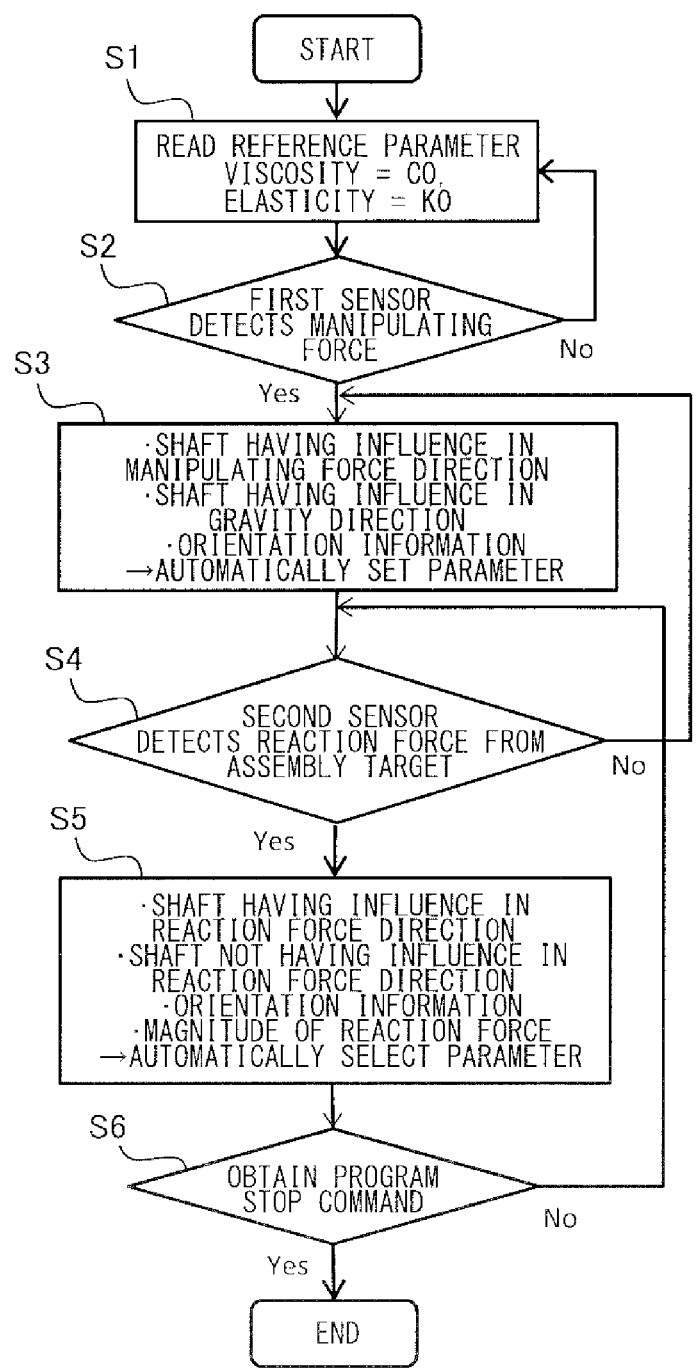
FIG. 3 is a flowchart of teaching of the first embodiment.

Next, FIG. 3 is a flowchart illustrating a control flow at the time of teaching in the present embodiment. When the teaching operation is started, first, in step S1, a reference value of the parameter of the impedance control system is set. Specifically, an initial value of the parameter of the impedance control system stored in the memory of the robot controller 14 in advance is read. The reference value of the parameter of the impedance control system is set in consideration of the weight of the robot itself such that the robot does not start moving by its own weight.

Next, in step S2, whether or not the torque sensor 21 serving as a first sensor has detected the manipulating force applied by the teaching operator is checked. In the case where the manipulating force has not been detected, the parameter is kept at the reference value.

When the torque sensor 21 detects the manipulating force, in step S3, the parameter of the impedance control system is automatically set such that it becomes easier to move the hand 12 in the direction in which the manipulating force is applied.

Next, in step S4, whether or not the force sensor 22 serving as a second sensor has detected the reaction force from the work target object is checked. When the force sensor 22 detects the reaction force from the work target object, in step S5, the parameter is automatically set such that the teaching operator feels a resistance force in the direction of the reaction force from the work target object and it becomes more difficult to move the hand 12 in the direction of the manipulating force.

In step S6, whether or not a program stop command has been obtained is determined, and until the stop command is obtained, the teaching operation is continued while updating the parameter of the impedance control system on the basis of the forces detected by the torque sensor 21 and the force sensor 22.

FIG. 4 illustrates an example of a parameter table of the impedance control system. The virtual viscosity coefficient and virtual elasticity coefficient are set in accordance with the magnitude of the reaction force from the work target object. The parameter table may be set for each work target object such as the workpiece gripped by the hand or the assembly target workpiece and selected appropriately, or the same table may be used for all cases.

Figure 5:
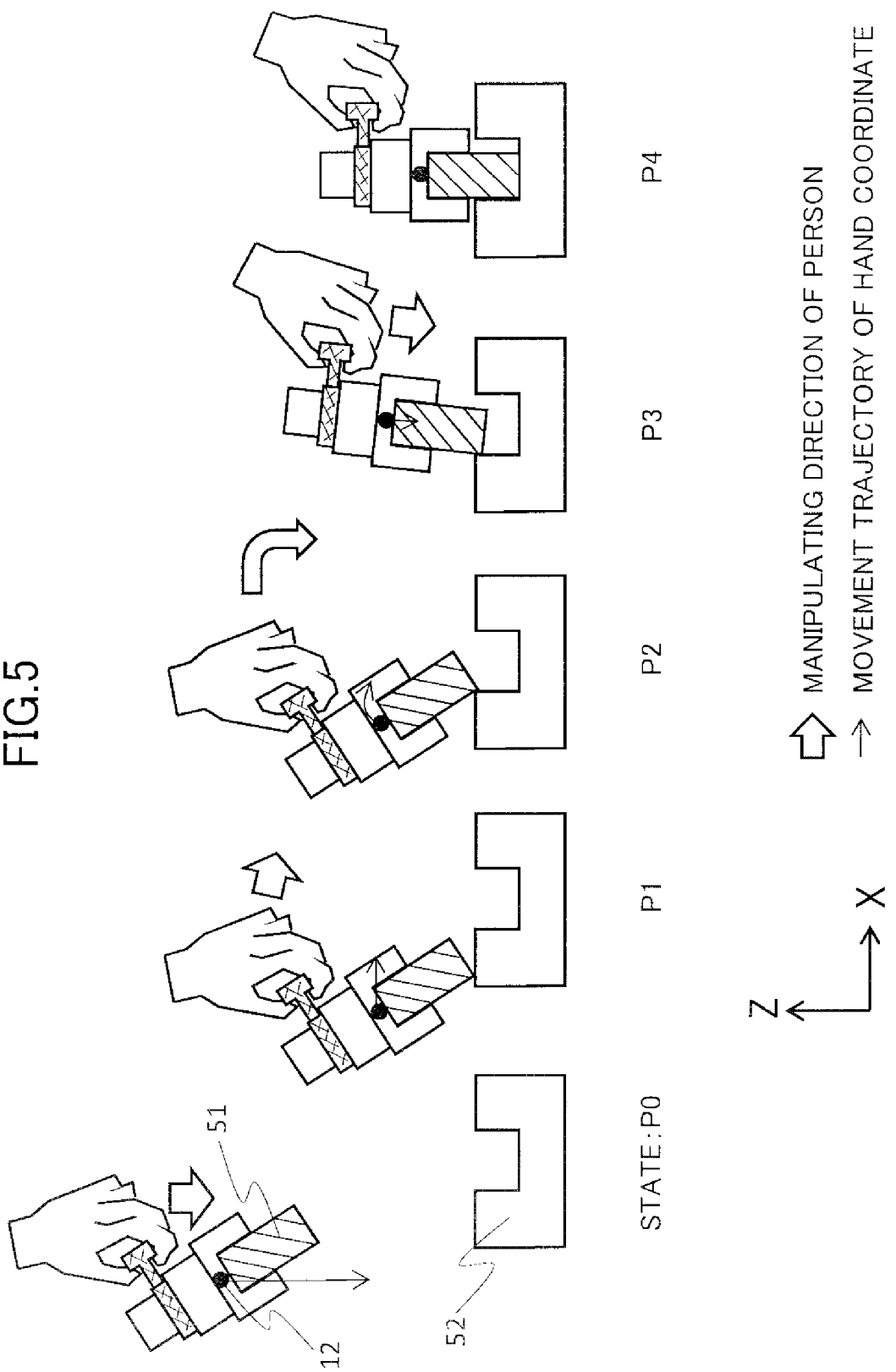
FIG. 5 is a diagram illustrating each stage of a series of operations of teaching.

Next, an example in which the teaching operator teaches a work operation will be described with reference to FIG. 5. FIG. 5 illustrates a series of operations of teaching in respective stages from P0 to P4, and the time passes in the direction from the left to the right in the figure. The teaching operator moves the hand 12 by manipulating the handling portion by hand, and thus teaches an operation of fitting the gripped workpiece 51 gripped by the hand 12 into a recess portion of the assembly target workpiece 52. The gripped workpiece 51 is a part of the work target object, and the assembly target workpiece 52 is another part of the work target object.

First, the state P0 is a state in which the hand 12 gripping the gripped workpiece 51 is disposed above the assembly target workpiece 52, and the teaching operator is holding the handling portion. The teaching operator applies a manipulating force in a −Z direction to the handling portion 13 to move the hand downward in the vertical direction to approach the assembly target workpiece 52.

The state P1 is a state in which the gripped workpiece 51 and the assembly target workpiece 52 are in contact with each other. When the gripped workpiece 51 comes into contact with the upper surface of the assembly target workpiece 52, the teaching operator moves the gripped workpiece 51 in a +X direction while maintaining the contact to approach the recess portion of the assembly target workpiece 52. That is, the teaching operator applies a manipulating force for movement in the +X direction while also applying a small manipulating force in the −Z direction.

Next, the state P2 is a state in which, as a preliminary stage before moving onto a fitting operation, the teaching operator is checking whether or not the gripped workpiece 51 has reached a corner of the recess portion of the assembly target workpiece 52. As will be described later with reference to FIG. 6, according to the impedance control of the present embodiment, since ease of movement for the teaching operator changes when the reaction force changes, the teaching operator can easily recognize that the gripped workpiece 51 has reached a corner of the recess portion. Therefore, when the gripped workpiece 51 reaches the corner of the recess portion, the teaching operator changes the manipulating force applied to the handling portion to adjust the orientation of the hand 12.

The state P3 is a state in which the orientation of the hand 12 has been adjusted to a state in which the gripped workpiece 51 can be fit into the groove portion (recess portion) of the assembly target workpiece 52.

The state P4 is a state in which the hand 12 has been moved in the −Z direction by applying the manipulating force in the −Z direction to the handling portion and thus the gripped workpiece 51 is fit into the assembly target workpiece 52.

The reaction force received by the hand and the operation of the impedance control system in the teaching operation described above will be described with reference to FIG. 6.

Figure 6:
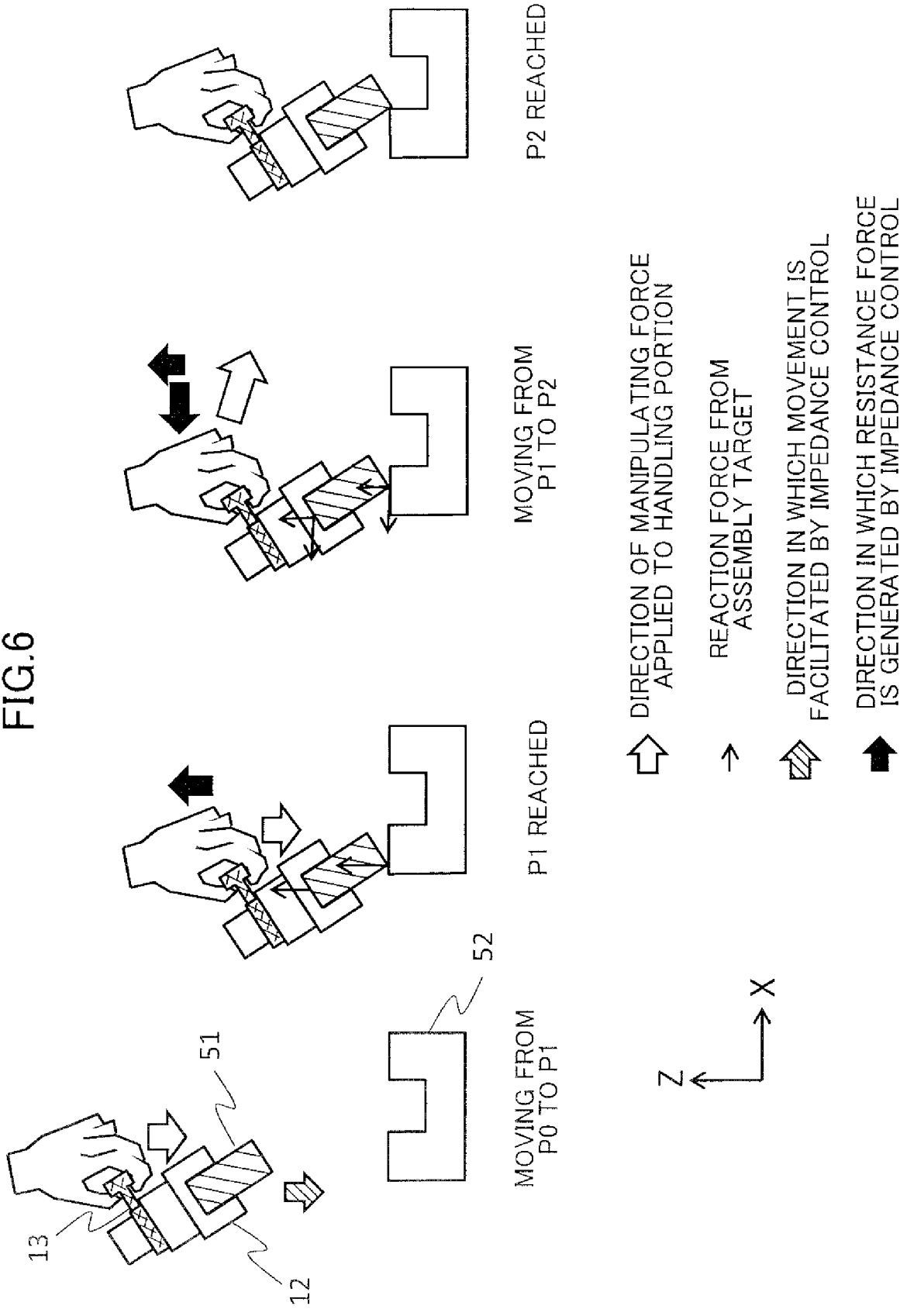
FIG. 6 is a diagram illustrating a state of reaction force received by the hand in each stage.

As illustrated in the left side of FIG. 6, in the course of movement from P0 to P1, the gripped workpiece 51 gripped by the hand 12 is not in contact with the assembly target workpiece 52 yet, and therefore the six-axis force sensor of the hand 12 does not detect the reaction force. In this state, the impedance control system parameter setting portion 31 of the robot controller 14 adjusts the parameter of the impedance control system such that the hand 12 can be easily moved in the direction of the manipulating force applied to the handling portion 13.

When the hand reaches P1, the gripped workpiece 51 comes into contact with the assembly target workpiece 52, a reaction force is generated in a +Z direction, and this reaction force is transmitted to the hand 12 through the gripped workpiece 51. When the six-axis force sensor of the hand 12 detects this reaction force, the impedance control system parameter setting portion 31 adjusts the parameter of the impedance control system such that it becomes more difficult to move the hand 12 in the direction of the manipulating force applied to the handling portion 13. The teaching operator feels a resistance force in the same direction as the reaction force if the teaching operator tries to move the hand by applying the manipulating force. As a result of this, the teaching operator can feel the contact between the gripped workpiece 51 and the assembly target workpiece 52 by the sensation of the hand thereof, and thus can move onto the next teaching operation. In the case where the teaching operator cannot feel the contact of the gripped workpiece 51, the teaching operator continues applying a downward manipulating force (−Z direction) in this example, and therefore there is a possibility that an excessive force is applied between the gripped workpiece 51 and the assembly target workpiece 52 and either one or both of these are broken. In addition, in the case where the gripped workpiece 51 is a flexible member, breakage might not occur, but there is a possibility that deformation occurs and subsequent operations (for example, an inserting operation) become difficult.

However, the present embodiment enables the teaching operator to easily feel the reaction force in the Z direction from the assembly target object. Therefore, the teaching operator becomes capable of proceeding the teaching operation by controlling the force more finely after the gripped workpiece has come into contact with the assembly target workpiece.

Next, during the operation of movement from P1 to P2 to search for the position of the fitting portion, the teaching operator manipulates the handling portion 13 to move the gripped workpiece 51 in the +X direction while pressing the gripped workpiece 51 in the −Z direction against the assembly target workpiece 52. A reaction force is generated in a −X direction and the +Z direction, and this reaction force is transmitted to the hand 12 through the gripped workpiece 51 and detected by the six-axis force sensor of the hand 12. When the reaction force is detected, the impedance control system parameter setting portion 31 adjusts the parameter of the impedance control system such that it becomes more difficult to move the hand 12 in the direction of the manipulating force applied to the handling portion 13. The teaching operator feels a resistance force in the same direction as the reaction force if the teaching operator tries to move the hand by applying the manipulating force. As a result of this, the teaching operator can feel the frictional force generated when the gripped workpiece 51 is slid while being pressed against the assembly target workpiece 52 as a resistance force by the sensation of the hand thereof, and thus can perform the operation of searching for the position of the fitting portion as intended.

Then, as illustrated in the right side of FIG. 6, when P2 is reached, the reaction force changes to be temporarily immensely smaller in the state in which the gripped workpiece 51 is at the corner of the recess portion of the assembly target workpiece 52. Since the impedance control of the present embodiment enables the teaching operator to feel the change in the reaction force as change in the resistance force with high sensitivity by hand, the teaching operator can easily sense that the corner of the recess portion has been reached. Since the assembly target workpiece reaching the corner portion can be sensed, the teaching operator can change the orientation of the hand without overrun, and move onto the operation of insertion into the recess portion.

Figure 7:
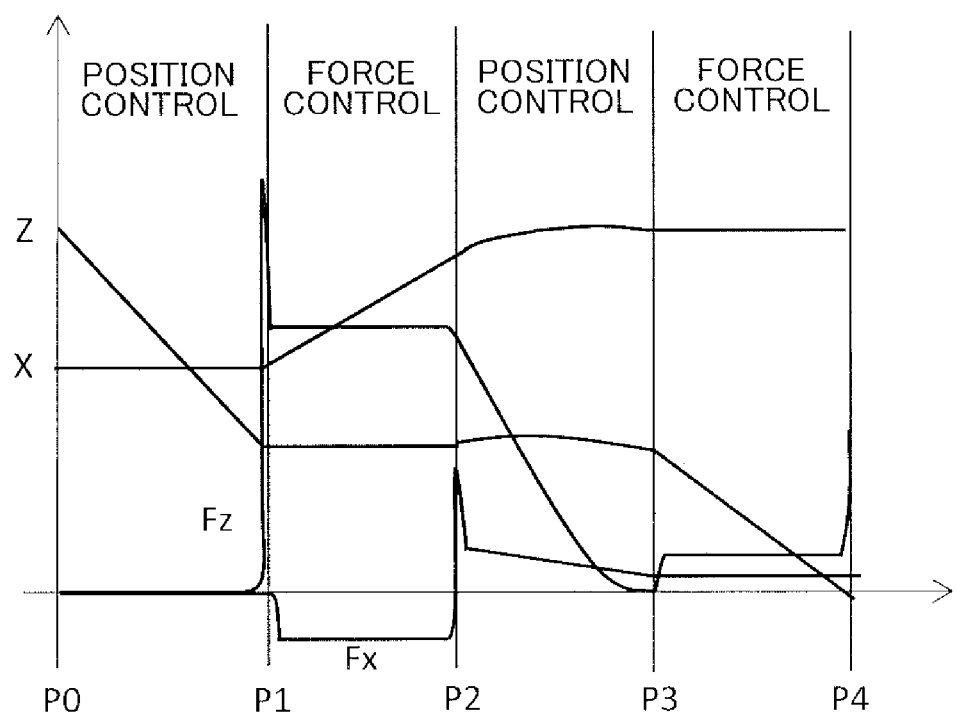
FIG. 7 is a diagram illustrating the content of a working control program generated by the teaching.

FIG. 7 is a diagram for describing the content of the work control program generated by the robot operation plan generation portion 32 for performing the work operation of the taught fitting assembly.

In the figure, a graph Z indicates the change in the Z coordinate of a fingertip portion of the hand and indicates that, for example, the fingertip portion moves downward in the vertical direction from the state P0 to the state P1 and there is no change in the coordinate of the Z direction from the state P1 to the state P2.

In addition, a graph X indicates the change in the X coordinate of the fingertip portion of the hand and indicates that, for example, there is no change in the coordinate of the X direction from the state P0 to the state P1 and the fingertip portion moves in the X direction from the state P1 to the state P2.

In addition, Fz in the graph indicates the reaction force in the Z direction detected by the force sensor 22 serving as a second sensor, and it can be seen that, for example, a large reaction force is detected instantaneously when the gripped workpiece 51 comes into contact with the assembly target workpiece 52 in the state P1. Further, it can be seen that the reaction force in the Z direction is approximately constant from the state P1 to the state P2 due to the impedance control.

In addition, Fx in the graph indicates the reaction force in the X direction detected by the force sensor 22 serving as a second sensor, and it can be seen that, for example, an approximately constant reaction force is received from the assembly target workpiece 52 in the −X direction from the state P1 to the state P2.

First, in the teaching stage, the teaching operator performs an operation of moving the hand only in the −Z direction in a section from P0 to P1. Until the contact with the assembly target workpiece occurs, the forces of Fx and Fz as the reaction force are not generated, and only the position in the Z direction changes. Once the contact with the assembly target workpiece occurs, a force of +Fz is generated, and the force of +Fz increases until a person detects the contact and stops the robot. In a section from P1 to P2, a person causes movement in the +X direction while applying a constant force in the −Z direction. Until a corner of the recess portion of the assembly target workpiece is reached, a reaction force (+Fz) against the pressing force in the −Z direction and a reaction force (−Fx) derived from friction is generated in the −X direction. The position in the +X direction changes until the person senses that the corner of the recess portion of the assembly target workpiece has been reached and stops the movement in the X direction. In a section from P2 to P3, the teaching operator changes the orientation of the robot. P3 is a state in which the gripped workpiece is in contact with a wall surface of a groove of the assembly target. In a section from P3 to P4, the teaching operator moves the gripped workpiece in the −Z direction along the wall surface of the recess portion of the assembly target workpiece, and fits the gripped workpiece in the assembly target workpiece.

In the present embodiment, the robot controller stores the position and orientation of the robot and force profile information of the torque sensor and the force sensor from P0 to P4 in the teaching stage, and the robot operation plan generation portion 32 generates the work operation program.

That is, not only the position and orientation (trajectory) of the robot but also the magnitude and direction of the reaction force that the robot receives from the work target object in each step of the work, that is, of the force to be applied to the work target object are taught.

In the work operation program generated by the robot operation plan generation portion 32, the impedance control system parameter setting switching portion 34 switches the parameter of the impedance control on the basis of the detection information of the force sensor 22 serving as a second sensor.

An operation stage in which the work operation program is executed will be described in detail below with reference to FIG. 7. To be noted, the work operation program may be stored in a memory in the robot controller 14 at the time of teaching, or may be temporarily stored in an external storage device and loaded to the robot controller 14 through a network or a computer-readable recording medium.

In the section from P0 to P1, the reaction force detected by the force sensor 22 is 0. In this section, the robot operation commanding portion 33 transmits a driving signal of position control mode to the robot driving system 35 such that an operation in which the X coordinate of the hand is a constant value and the Z coordinate of the hand is expressed by a linear function (proportional) is performed.

Then, if a quick change is detected in the reaction force Fz by the force sensor 22, the robot controller determines that the state P1 has been reached, and the impedance control system parameter setting switching portion 34 switches the parameter of the impedance control. The switching may be performed by setting the variation ratio (differential value) of the reaction force Fz exceeding a predetermined threshold value as a condition, or may be performed by setting the value of the reaction force Fz itself exceeding a predetermined threshold value as a condition.

In the section from P1 to P2, control is performed such that the X coordinate is expressed by a linear function (proportional) and the Z coordinate is a constant value. Since the reaction force is approximately constant over the entirety of this section, the robot operation commanding portion 33 transmits a driving signal of force control mode to the robot driving system 35 such that a force applied to the distal end of the robot is constant. That is, the operation mode is switched from the position control mode to the force control mode.

Then, when a quick change in the reaction force Fx is detected by the force sensor 22, the robot controller determines that the state P2 has been reached, and the impedance control system parameter setting switching portion 34 switches the parameter of the impedance control. The switching may be performed by setting the variation ratio (differential value) of the reaction force Fz exceeding a predetermined threshold value as a condition, or may be performed by setting the value of the reaction force Fz itself exceeding a predetermined threshold value as a condition.

In the section from P2 to P3, the orientation of the hand is changed, but neither of the X coordinate and the Z coordinate changes linearly, and the reaction forces Fx and Fz are not constant. Since the forces are not constant in the entirety of the section, the robot operation commanding portion 33 transmits a driving signal of position control mode to the robot driving system 35 such that the operation trajectory of changing the orientation in the teaching is reproduced as it is.

In the section from P3 to P4 in which the orientation change has been completed, the X coordinate is a constant value, the Z coordinate is proportional, and are both expressed by linear functions. Since the reaction force is approximately constant over the entirety of the section, the robot operation commanding portion 33 transmits a driving signal of force control mode to the robot driving system 35 such that the force applied to the distal end of the robot is constant.

Then, when a quick change in the reaction force Fz is detected by the force sensor 22, the robot controller determines that the state P4 has been reached, and transmits a signal for finishing the driving to the robot driving system 35. The finishing may be performed by setting the variation ratio (differential value) of the reaction force Fz exceeding a predetermined threshold value as a condition, or may be performed by setting the value of the reaction force Fz itself exceeding a predetermined threshold value as a condition.

According to the present embodiment, by switching the parameter of the impedance control system while measuring the reaction force applied to the hand, a taught operation can be accurately executed even in the case where the work target object is displaced.

Figure 8A:
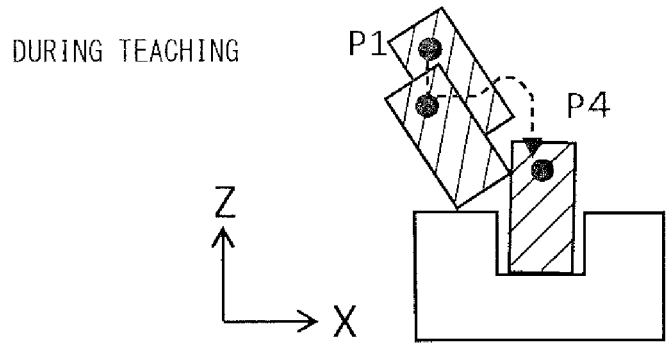
FIG. 8A is a diagram illustrating a positional relationship, during teaching, between a gripped workpiece and an assembly target workpiece.
Figure 8B:
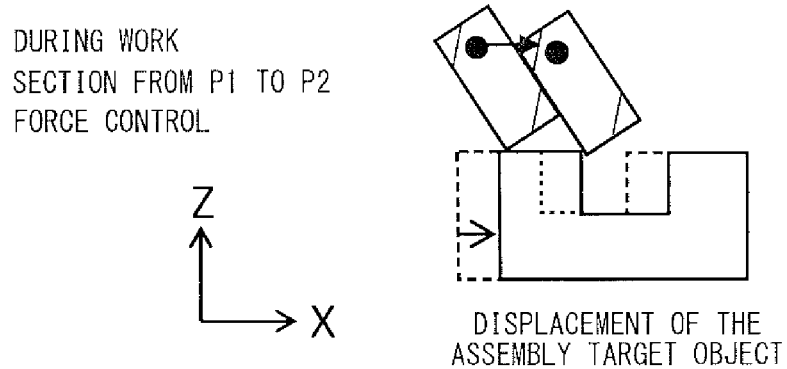
FIG. 8B is a diagram illustrating a positional relationship, during work, between the gripped workpiece and the assembly target workpiece.
Figure 8C:
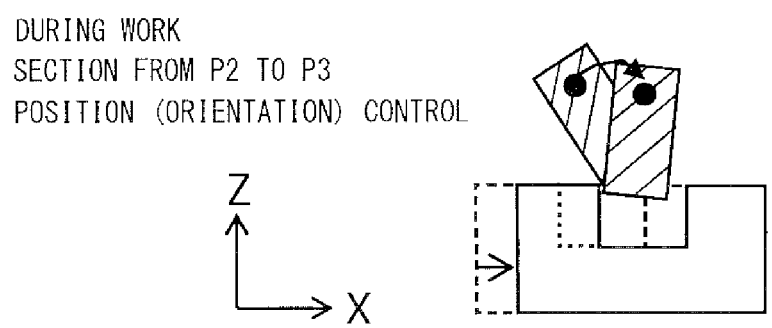
FIG. 8C is a diagram illustrating a positional relationship, during work, between the gripped workpiece and the assembly target workpiece.
Figure 8D:
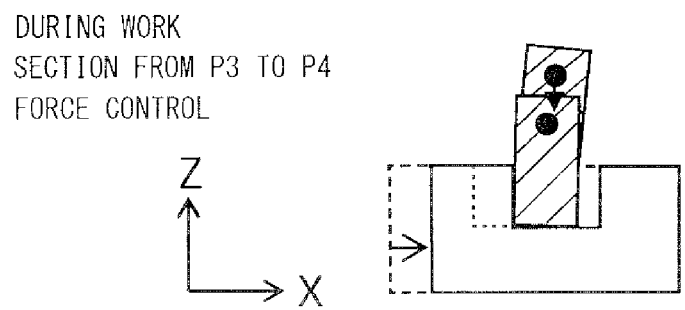
FIG. 8D is a diagram illustrating a positional relationship, during work, between the gripped workpiece and the assembly target workpiece.

FIGS. 8A to 8D are simplified diagrams for explaining this, and FIG. 8A illustrates a positional relationship between the gripped workpiece and the assembly target workpiece at the time of teaching. FIGS. 8B to 8D illustrate cases where the assembly target workpiece is set at a position indicated by a solid line displaced from a position at the time of teaching indicated by a dotted line.

In the case where the hand is controlled on the basis of only the positional coordinates at the time of work, the reaching to the state P2, that is, the reaching to the corner of the recess portion cannot be accurately detected when the assembly target workpiece is displaced from the time of the teaching, and therefore the orientation change of the hand or the fitting operation in the −Z direction thereafter cannot be accurately performed. Not only the fitting operation cannot be performed, but also, in some case, there is a possibility that the workpiece or the robot itself is broken.

However, according to the present embodiment, the parameter of the impedance control system is taught such that the reaching to the corner of the recess portion of the assembly target workpiece can be detected by the force sensor 22 with high sensitivity. In FIG. 8B, by performing control of continuously applying a force in the same direction until the corner of the recess portion is detected on the basis of a measurement value of the reaction force by the force sensor 22, the work operation can be appropriately proceeded even in the case where the assembly target workpiece is displaced. In addition, in FIG. 8C, since the relative positions of the gripped workpiece and the assembly target workpiece are the same as those at the time of teaching, the operation trajectory of orientation change may be reproduced without changing anything. Further, in FIG. 8D, it can be determined that the state P4 has been reached, when a quick change in the reaction force Fz is detected. This determination may be made by setting the variation ratio (differential value) of the reaction force Fz exceeding a predetermined threshold value as a condition, or may be made by setting the value of the reaction force Fz itself exceeding a predetermined threshold value as a condition.

As described above, according to the present embodiment, since the work program is generated by performing impedance control such that the teaching operator is likely to sense the contact state between the hand and the work target object, the position, orientation, and the force to be applied can be efficiently taught. Further, a work algorithm for switching the parameter of the impedance control system at the time of work can be generated on the basis of the reaction force measured at the time of teaching.

To be noted, although simplified description has been given above for easier understanding, in the case where the teaching operator actually performs teaching by operation using a hand, it is difficult to cause linear movement without an error, and it is also difficult to continuously apply a constant force. Therefore, for generating a control program of an actual work operation, it is preferable that oscillating data of teaching is filtered to separate and remove movements and force that are not original intentions of the teaching operator.

In addition, since there is a case where the detection value of the force sensor is affected by the weight thereof in accordance with the orientation thereof and changes, it is desirable that zero point calibration is necessarily performed in a specific orientation or the zero point calibration is performed in each operation, such that the influence of the orientation does not remain in the detected reaction force.

Second Embodiment

Figure 9:
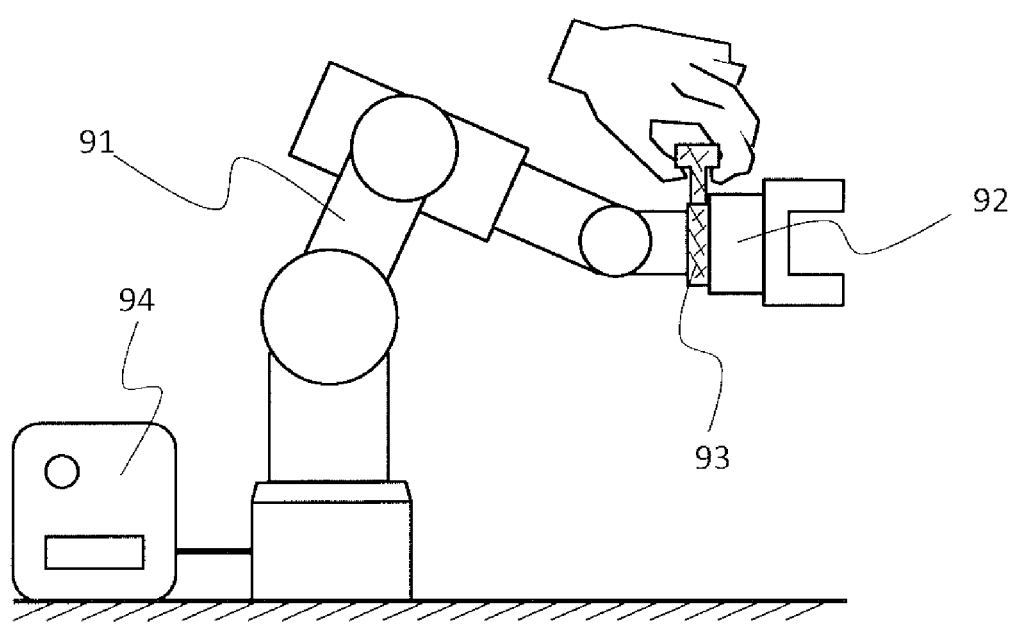
FIG. 9 is a diagram illustrating a simplified configuration of a working robot of a second embodiment.

FIG. 9 is a diagram illustrating a simplified configuration of a second embodiment of the present invention. In FIG. 9, a robot apparatus includes a robot arm 91, a hand 92 mounted on the distal end of the arm, a handling portion 93 of a force sensor-incorporating type attached between the hand 92 and the robot arm 91, and a robot controller 94. Descriptions of portions common to the first embodiment will be omitted.

The present embodiment is different in that, whereas the manipulating force applied to the handling portion by the teaching operator is detected on the basis of the measurement value of the torque sensor of each joint and the reaction force detected by the six-axis force sensor in the first embodiment, in the present embodiment, the manipulating force is measured by the force sensor incorporated in the handling portion 93.

In the present embodiment, it can be said that the robot controller and the force sensor incorporated in the handling portion 93 constitute a manipulating force detection means or a manipulating force detection portion.

Whereas the process for calculating the direction and magnitude of the manipulating force is complicated to a certain extent in the first embodiment, the manipulating force can be detected in a simpler manner according to the present embodiment.

The force sensor incorporated in the handling portion 93 is capable of measuring the manipulating force applied to the robot arm 91 and communicating the measurement result with the robot controller 94 at a predetermined period.

In the present embodiment, the same effect as in the first embodiment can be achieved by detecting the manipulating force from a person by the force sensor incorporated in the handling portion 93 and detecting the reaction force from the assembly target by the force sensor incorporated in the hand 92. To be noted, to reduce the influence of the reaction force from the assembly target as much as possible when detecting the manipulating force from a person, it is desirable that the force sensor incorporated in the handling portion 93 is disposed at a position in the handling portion as far away as possible from the hand 92.

Similarly to the first embodiment, since the work program is generated by performing impedance control such that the teaching operator is likely to sense the reaction force applied to the hand in the teaching stage, a trajectory with high positional precision can be efficiently taught. Further, the work algorithm of switching the parameter of the impedance control system at the time of work can be generated on the basis of the reaction force measured at the time of teaching.

At the time of work, by switching the parameter of the impedance control system while measuring the reaction force applied to the hand, the taught operation can be accurately performed even in the case where the work target object is displaced.

Third Embodiment

Figure 10:
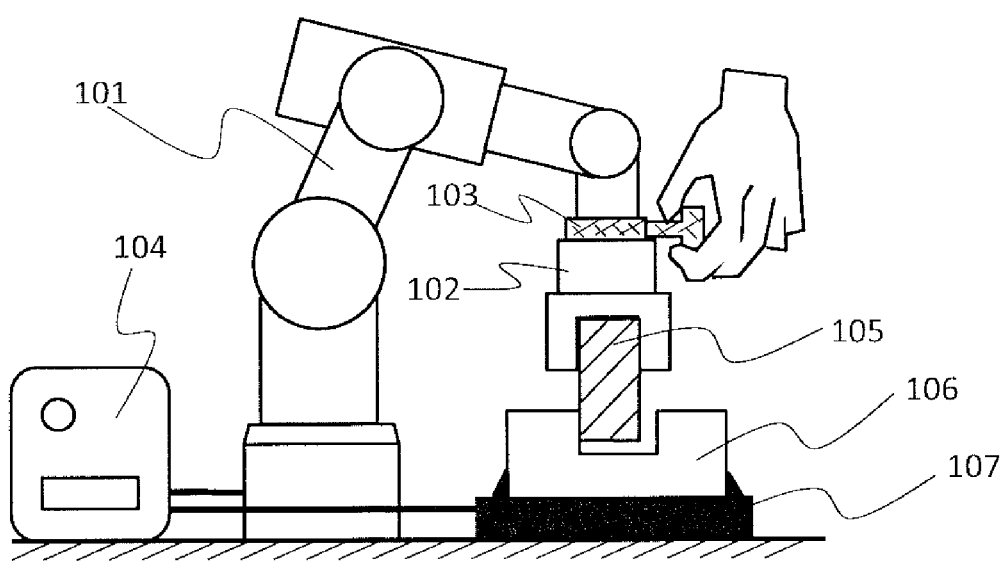
FIG. 10 is a diagram illustrating a simplified configuration of a working robot of a third embodiment.

FIG. 10 is a diagram illustrating a simplified configuration of a third embodiment of the present invention.

In FIG. 10, a robot apparatus includes a robot arm 101, a hand 102 mounted on the distal end of the robot, and a handling portion 103 attached between the robot arm 101 and the hand 102. In addition, a robot controller 104 that generates a driving command of the robot, and an assembly base 107 are included. The robot arm 101 is an articulated robot that includes a torque sensor in each joint shaft and that includes a motor and an encoder that are not illustrated in each joint shaft. Work of fitting a gripped workpiece 105 gripped by the hand 102 into an assembly target workpiece 106 is shown as an example. Descriptions of portions common to the first embodiment will be omitted.

In the first embodiment, the reaction force from the work target object is measured by a force sensor included in the hand as a second sensor. The present embodiment is different in that a force applied to the work target object by the hand is measured by using, as a second sensor, a force sensor incorporated in the assembly base 107 on which the assembly target workpiece 106 is placed. That is, the assembly target workpiece 106 is set on the assembly base 107 incorporating the force sensor as a second sensor, and the force applied to the work target object by the robot hand is measured by the incorporated force sensor. The force applied to the work target object by the hand and the reaction force that the hand receives from the work target object have a mutual action-reaction relationship, and have the same magnitude and opposite directions.

Therefore, the robot controller is capable of calculating the reaction force applied to the hand, on the basis of the measurement result of the force sensor incorporated in the assembly base 107.

In the present embodiment, the robot controller and the force sensor incorporated in the assembly base constitute a reaction force detection means or a reaction force detection portion.

In the present embodiment, the force sensor incorporated in the assembly base 107 detects the force applied to the assembly target workpiece by the hand, and the robot controller calculates the reaction force applied to the hand. In addition, the manipulating force applied to the handling portion 103 from the teaching operator is detected on the basis of the difference between the measurement result of the torque sensor incorporated in the robot arm 101 and the reaction force calculated by the robot controller. Also, in the present embodiment, the same effect as in the first embodiment can be achieved.

That is, since the work program is generated by performing impedance control such that the teaching operator is likely to sense the contact state between the hand and the work target object in the teaching stage, the position, orientation, and force to be applied can be efficiently taught. Further, on the basis of the reaction force calculated at the time of teaching, a work algorithm of switching the parameter of the impedance control system at the time of work can be generated.

At the time of work, by calculating the reaction force applied to the hand while measuring the force applied to the work target object from the hand and switching the parameter of the impedance control system, the taught operation can be accurately executed even in the case where the work target object is displaced.

Other Embodiments

Since the controller controls a parameter of an impedance control system such that the teaching operator can easily sense a reaction force applied to the hand at the time of teaching, the teaching operator can easily feel the contact, sliding, or the like between the hand and the work target object by sensation during the teaching operation. Therefore, a teaching operation requiring subtle force control can be efficiently performed, and a work program defining the magnitude and direction of a force to be exerted by the robot during operation can be efficiently generated. In addition, a control program including a work algorithm with which a parameter of an impedance control system can be switched during work can be generated.

During work, by the work algorithm with which the parameter of the impedance control system is switched while measuring the reaction force applied to the hand or the force that the hand applies to the work target object, the robot can precisely perform the work even in the case where the position of the work target object is displaced.

The embodiments of the present invention are not limited to the first to third embodiments described above and can be appropriately modified and combined, and thus various modifications can be made within the technical concept of the present invention.

For example, the working robot is not limited to a robot including an arm of six-axis control, and the work performed by the robot is not limited to a part fitting work. Applications to a wide variety of product manufacturing work using various types of working robots are possible.

The hand attached to the distal end of the arm is not limited to the embodiments described above, and may be various manipulators and the like.

The shape and installation position of the handling portion are not limited to the examples of the embodiments described above as long as the handling portion is a mechanism with which the teaching operator can easily apply a manipulating force to the hand or the robot arm by using a hand, and it is preferable that an easily-grippable grip or the like is provided at a position with good visibility.

In addition, the teaching of all the work procedures does not have to be performed by direct manipulation by the hand of the teaching operator, and teaching of part of the procedures may be performed by using a remote controlling device such as a teaching pendant or using a simulator.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A robot system comprising:
    a robot body comprising a predetermined portion;
    a controller;
    a manipulating force detection portion configured to detect an information relating to a manipulating force when an operator moves the predetermined portion; and
    a reaction force detection portion configured to detect an information relating to a reaction force received by the predetermined portion from an object,
    wherein, when the operator moves the predetermined portion, the controller is configured to control a resistance force in accordance with the reaction force and the manipulating force, and
    wherein, in a case where the reaction force has not been detected by the reaction force detection portion, the controller is configured to control the resistance force such that, when the operator moves the predetermined portion in a direction of the manipulating force, the resistance force becomes smaller than the resistance force when the manipulating force is not detected, and
    wherein the robot body comprises an end effector provided in the predetermined portion, and
    wherein the controller is configured to acquire the reaction force applied to the end effector, on the basis of position and orientation information of the end effector, and a detection result of the reaction force detection portion.

2. The robot system according to claim 1,
wherein, in a case where the reaction force has been detected by the reaction force detection portion, the controller is configured to control the resistance force such that, when the operator moves the predetermined portion in a direction of the manipulating force, the resistance force becomes larger than the resistance force when the operator moves the predetermined portion while the reaction force has not been detected.

3. The robot system according to claim 1, wherein, in a case where the reaction force has not been detected by the reaction force detection portion, the controller is configured to control the robot body such that the operator easily moves the predetermined portion in a direction of the manipulating force, and
wherein, in a case where the reaction force has been detected by the reaction force detection portion, the controller is configured to control the robot body such that it becomes more difficult for the operator to move the predetermined portion in the direction of the manipulating force.

4. The robot system according to claim 1, wherein the controller is configured to control the resistance force by controlling a parameter of an impedance controlling system of the robot body.

5. The robot system according to claim 4, wherein a reference value for the parameter is set in advance, and
wherein the controller is configured to control the resistance force by controlling the parameter based on the reference value.

6. The robot system according to claim 5, wherein the reference value is set such that the robot body does not start moving by its own weight.

7. The robot system according to claim 5, wherein in a case where the manipulating force has not been detected, the controller is configured to keep the reference value for the parameter.

8. The robot system according to claim 1, wherein the controller is configured to acquire an operation program for operating the robot body including a magnitude and direction of a force to be applied to the object based on the reaction force when the operator is moving the predetermined portion.

9. The robot system according to claim 8, wherein the controller is configured to filter data acquired while the operator is moving the predetermined portion and acquire the operation program.

10. The robot system according to claim 8, wherein, when the controller executes the operation program, the controller is configured to control a parameter of an impedance controlling system of the robot body based on a change of the reaction force while the robot body is operated.

11. The robot system according to claim 8, wherein, when the controller executes the operation program, the controller is configured to switch an operation mode on a basis of the reaction force while the robot body is operated.

12. The robot system according to claim 11, wherein, when the controller executes the operation program, the controller is configured to detect the predetermined portion or the work held by the predetermined portion comes into contact with the object based on the reaction force while the robot body is operated and switch the operation mode.

13. The robot system according to claim 11, wherein, the controller is configured to execute a position control mode and/or a force control mode as the operation mode.

14. The robot system according to claim 4, wherein the parameter of impedance control is either one or both of a virtual viscosity coefficient and a virtual elasticity coefficient used for force control of the robot body.

15. The robot system according to claim 4, wherein, when controlling the parameter of impedance control, the controller is configured to select a parameter from a parameter table of impedance control that has been stored in advance.

16. The robot system according to claim 1, wherein the robot body comprises a robot arm comprising a plurality of shafts, a handling portion configured to receive the manipulating force.

17. The robot system according to claim 16, wherein the manipulating force detection portion comprises a torque sensor provided in a shaft of the plurality of shafts or a torque sensor provided on a handling portion, and
wherein the reaction force detection portion comprises a force sensor provided on the end effector or a force sensor provided in a base on which the object is to be placed.

18. The robot system according to claim 17, wherein the handling portion is provided between the robot arm and the force sensor provided on the end effector.

19. The robot system according to claim 1, wherein the controller is configured to control the direction of the resistance force based on the direction of the reaction force and the direction of the manipulating force.

20. The robot system according to claim 1, wherein the resistance force is the resistance force when the operator directly contacts and moves the predetermined portion.

21. A manufacturing method for a product, the method comprising manufacturing a product by using the robot system according to claim 1.

22. The robot system according to claim 16, the controller further comprises a robot machine model registration portion that stores information of a shape or dimensions of the robot arm, and an end effector information registration portion that stores information of a shape or dimensions of the end effector.

23. The robot system according to claim 1, wherein the controller causes the operator to feel a frictional force between a first work that is held by the predetermined portion and a second work that is in contact with the first work, by controlling the resistance force in the same direction as the reaction force.

24. The robot system according to claim 1, wherein the controller is configured to control a change in the resistance force in accordance with a change in the reaction force.

25. The robot system according to claim 8, wherein the operation program includes an information of position or orientation of the robot body changed by the operator moving the predetermined part.

26. The robot system according to claim 8, wherein the controller is configured to acquire the operation program by dividing it into a plurality of sections based on a change in the reaction force.

27. The robot system according to claim 1, wherein the reaction force detection portion is configured to perform zero point calibration when the robot body is in n a specific orientation or for each operation executed by the robot body.

28. The robot system according to claim 16, wherein the manipulating force detection portion includes a force sensor incorporated in the handling portion.

29. A control method for a robot system comprising (a) a robot body comprising a predetermined portion (b) a controller, (c) a manipulating force detection portion configured to detect an information relating to a manipulating force when an operator moves the predetermined portion, and (d) a reaction force detection portion configured to detect an information relating to a reaction force received by the predetermined portion from an object, the control method comprising:

controlling, by the controller, when the operator moves the predetermined portion, a resistance force in accordance with the reaction force and the manipulating force, wherein, in a case where the reaction force has not been detected by the reaction force detection portion, the controller is configured to control the resistance force such that, when the operator moves the predetermined portion in a direction of the manipulating force, the resistance force becomes smaller than the resistance force when the manipulating force is not detected, and wherein the robot body comprises an end effector provided in the predetermined portion, and wherein the controller is configured to acquire the reaction force applied to the end effector, on the basis of position and orientation information of the end effector, and detection result of the reaction force detection portion.

30. A non-transitory computer-readable recording medium storing a program for causing a computer to execute the control method for the robot system according to claim 29.

31. A robot system comprising:

a robot body comprising a predetermined portion;

a controller;

a manipulating force detection portion configured to detect an information relating to a manipulating force when an operator moves the predetermined portion; and a reaction force detection portion configured to detect an information relating to a reaction force received by the predetermined portion from an object, wherein, when the operator moves the predetermined portion, the controller is configured to control a resistance force in accordance with the reaction force and the manipulating force, and wherein, in a case where the reaction force has not been detected by the reaction force detection portion, the controller is configured to control the resistance force such that, when the operator moves the predetermined portion in a direction of the manipulating force, the resistance force becomes smaller than the resistance force when the manipulating force is not detected, wherein the robot body comprises a robot arm comprising a plurality of shafts, a handling portion configured to receive the manipulating force, and an end effector provided in the predetermined portion, and wherein the controller is configured to acquire the manipulating force applied to the handling portion, on the basis of posture information of the robot arm, position and orientation information of the end effector, and detection result of the manipulating force detection portion.

32. A control method for a robot system comprising (a) a robot body comprising a predetermined portion, (b) a controller, (c) a manipulating force detection portion configured to detect an information relating to a manipulating force when an operator moves the predetermined portion, and (d) a reaction force detection portion configured to detect an information relating to a reaction force received by the predetermined portion from an object, the control method comprising:

controlling, by the controller, when the operator moves the predetermined portion, a resistance force in accordance with the reaction force and the manipulating force, wherein, in a case where the reaction force has not been detected by the reaction force detection portion, the controller is configured to control the resistance force such that, when the operator moves the predetermined portion in a direction of the manipulating force, the resistance force becomes smaller than the resistance force when the manipulating force is not detected, wherein the robot body comprises a robot arm comprising a plurality of shafts, a handling portion configured to receive the manipulating force, and an end effector provided in the predetermined portion, and wherein the controller is configured to acquire the manipulating force applied to the handling portion, on the basis of posture information of the robot arm, position and orientation information of the end effector, and a detection result of the manipulating force detection portion.

* * * * *